July 29, 1930.  F. W. KRONE  1,771,963
FILLER RING FOR TIRE STRUCTURES
Filed July 12, 1928
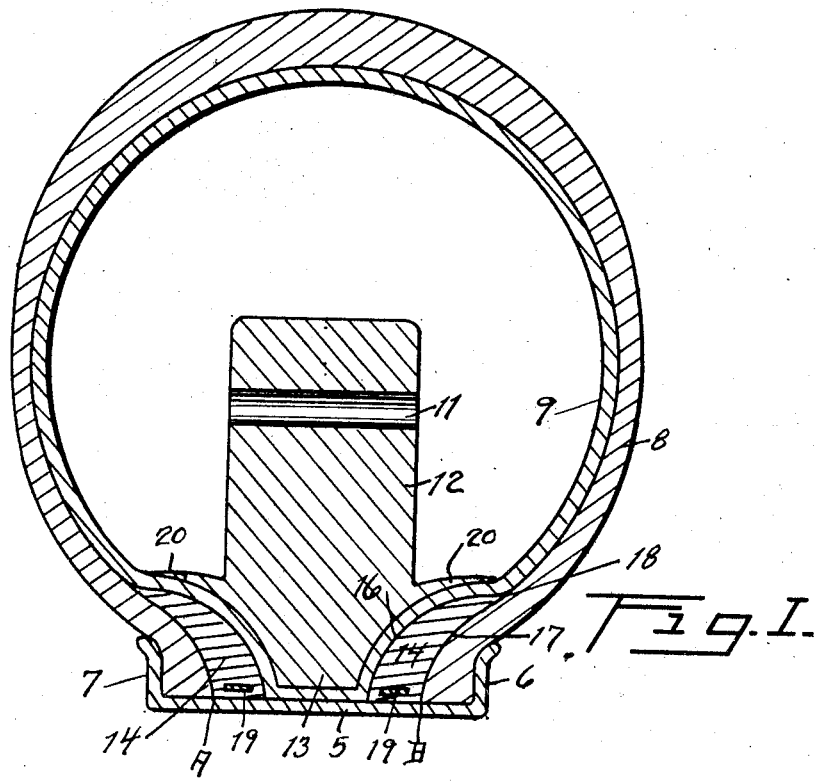
Fig. I.
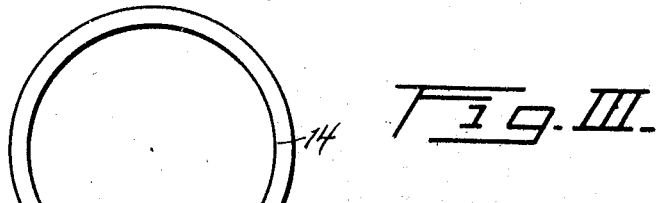
Fig. III.
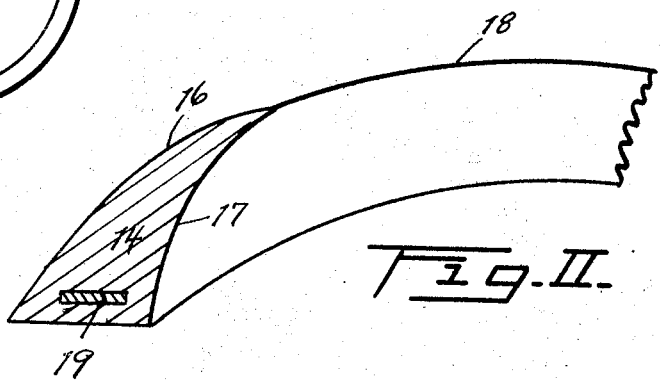
Fig. II.
INVENTOR.
F. W. KRONE
BY Victor J. Evans
ATTORNEYS.

Patented July 29, 1930

1,771,963

UNITED STATES PATENT OFFICE

FREDERICK W. KRONE, OF SAN FRANCISCO, CALIFORNIA

FILLER RING FOR TIRE STRUCTURES

Application filed July 12, 1928. Serial No. 292,099.

This invention relates to improvements in tire structures and has particular reference to a filler ring or adapter strip positioned therein and adapted to be interposed between the base of the inner tube and the inside of the beads of the casing to allow for the employment of my improved cushion in varying widths of wheel rims.

The referred to tube is described in my Patent No. 1,636,779 issued July 26th, 1927, and is designed to prevent, in addition to its other objects, the rim cutting of a tire when the same is deflated, which action is effected by employing the cushion element with the inner tube so that when the tire is deflated, the cushion is interposed between the tire and the rim. However, my cushion tube has been initially employed in rims of narrow widths and in order that its range of use may be increased and the cushion tube made applicable to rims of varying widths, I have devised my present invention.

I propose to insert the referred to filler rings between the rim zone of the tube and the rim zone of the casing, the size of the filler ring employed depending on the width of the rim that holds the improved cushion tube. It will be obvious that in the use of said filler ring any empty space will be compensated for and accordingly the filler ring thus provides a positive means for allowing the use of the cushion tube with different types of tires and different widths of rims.

Other objects and advantages will be apparent during the course of the following description.

In the accompanying drawing forming a part of this specification and in which like numerals are employed to designate like parts throughout the same, Figure 1 is a vertical cross section of a tire casing and rim having my invention applied thereto, Figure 2 is a fragmentary detail perspective view of one of the filler strips, and Figure 3 is a side elevation on a reduced scale of one of the filler strips or rings.

In the accompanying drawing wherein for the purpose of illustration is shown a preferred embodiment of my invention, the numeral 5 designates a rim of the ordinary construction having upstanding sides 6 and 7. The numeral 8 designates the ordinary tire casing, the numeral 9, the tube, within which is placed a cushion element 11 having openings 12 therethrough. The lower portion of the cushion element is tapered so as to form a relatively narrow base 13 which base is of less width than the distance between the points A and B, which points designate the adjacent margins of the tire casing at the points where it engages the rim. The numeral 14 designates a filler strip which is inserted between the lower portion of the cushion and the side of the casing.

In the present instance I have shown a filler strip upon both sides of the cushion, but it is obvious that a single filler of greater dimensions could be employed and still accomplish the same object. This filler ring is provided with a convex side 16 and a concave side 17, which construction permits the ring to conform more readily to the outside contour of the tube and the inside contour of the casing base and assures a snug fit of the ring therebetween. A reinforcing strip 19, which preferably consists of a cable, braided wire or the like, of such consistency as to eliminate danger of stretching, is placed in the base of the ring.

It is to be noted that lips 20 are formed on the cushion and serve not only to strengthen the tube and to prevent the same from buckling but also due to the fact that the lips flare outwardly cooperate with the lower edges of the casing to retain the rings against displacement between the casing edges and the outer walls of the tube.

It has also been found that in addition to the other advantages of the ring, the same facilitates the compensating, rotating motion of the casing when the tire is run deflated.

From the foregoing description, constructed in connection with the accompanying drawing, it will be evident that I have devised an economically constructed, strong, durable and highly efficient filler ring that has a unique field of use and will readily accomplish the objects herein set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

A tire structure including an outer casing, an inflatable inner tube within said casing and having a rim zone portion of comparatively massive structure provided with a pair of lips engaging the inner periphery of the tube, a pair of filler rings between said portion and the edges of the casing, the lips of said massive portion cooperating with the casing edges to retain the rings against displacement.

In testimony whereof I affix my signature.

FREDERICK W. KRONE.